(12) United States Patent
Kurosaki et al.

(10) Patent No.: US 8,182,049 B2
(45) Date of Patent: May 22, 2012

(54) VEHICLE BRAKE HYDRAULIC PRESSURE CONTROL APPARATUS

(75) Inventors: Takashi Kurosaki, Nagano (JP);
Yoshiyuki Takamatsu, Nagano (JP);
Keiichi Takaku, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 977 days.

(21) Appl. No.: 12/175,908

(22) Filed: Jul. 18, 2008

(65) Prior Publication Data
US 2009/0025383 A1   Jan. 29, 2009

(30) Foreign Application Priority Data

Jul. 25, 2007   (JP) ............................. P. 2007-193222

(51) Int. Cl.
*B60T 8/60* (2006.01)
(52) U.S. Cl. ................ 303/155; 303/116.1; 303/119.1
(58) Field of Classification Search .................. 303/155, 303/156, 119.1, 116.1
See application file for complete search history.

(56) References Cited

U.S. PATENT DOCUMENTS

| | | | | |
|---|---|---|---|---|
| 6,364,436 | B1 * | 4/2002 | Sawada | 303/191 |
| 7,216,939 | B2 * | 5/2007 | Obai | 303/11 |
| 7,857,399 | B2 * | 12/2010 | Kito et al. | 303/119.1 |
| 8,007,054 | B2 * | 8/2011 | Kobayashi et al. | 303/119.1 |
| 2005/0225164 | A1 | 10/2005 | Obai | |
| 2006/0255659 | A1 | 11/2006 | Obai | |

FOREIGN PATENT DOCUMENTS

| | | |
|---|---|---|
| JP | 09240451 | 9/1997 |
| JP | 2003-19952 | 1/2003 |
| JP | 2003019952 | 1/2003 |
| JP | 2006315526 | 11/2006 |
| JP | 2008006905 | 1/2008 |
| JP | 2008110716 | 5/2008 |

OTHER PUBLICATIONS

Office action for corresponding Japanese Application No. 2007-193222.
European Search Report for corresponding European Application No. 08013248.3-2423 dated Sep. 30, 2010.

\* cited by examiner

*Primary Examiner* — Robert A Siconolfi
*Assistant Examiner* — Mariano Sy
(74) *Attorney, Agent, or Firm* — Andrew M. Calderon; Roberts Mlotkowski Safran & Cole, P.C.

(57) ABSTRACT

A controller includes an initial current value calculation unit calculating an initial current value to open a normally open linear solenoid valve when a hydraulic pressure is shifted from a pressure reducing state or a pressure holding state to a pressure increasing state, a valve opening amount increasing unit reducing the energization amount from the initial current value so that a valve opening amount of the normally open linear solenoid valve increases, an offsetting necessity determination unit determining based on a predetermined condition whether or not the energization amount needs to be offset to an increase side when the valve opening amount increasing unit reduces the energization amount, and an energization amount offsetting unit offsetting at least once the energization amount to an increase side only for a predetermined time period when it is determined that such offsetting is necessary.

19 Claims, 5 Drawing Sheets

CONVENTIONAL

VEHICLE BRAKE HYDRAULIC PRESSURE CONTROL APPARATUS

BACKGROUND OF THE INVENTION

1. Field of the Invention

The present invention relates to a vehicle brake hydraulic pressure control apparatus which utilizes normally open linear solenoid valves as inlet valves.

2. Description of Related Art

In general, there is known a vehicle brake hydraulic pressure control apparatus which is disposed between a master cylinder which generates a hydraulic pressure according to a pedal effort applied by the driver and wheel brakes which apply brake forces to road wheels for controlling brake forces generated at the wheel brakes.

A vehicle brake hydraulic pressure control apparatus like this includes mainly normally open inlet valves for allowing transmission of the brake hydraulic pressure from the master cylinder side to the wheel brakes, normally closed outlet valves for allowing hydraulic pressures acting on the wheel brakes to escape therefrom, reservoirs for reserving temporarily the brake hydraulic pressures which are allowed to escape from the wheel cylinders by the outlet valves being opened and pumps for returning brake fluid within the reservoirs towards the inlet valves.

In addition, as the vehicle brake hydraulic pressure control apparatus that has been described above, there is conventionally known a vehicle brake hydraulic pressure control apparatus which adopts normally open linear solenoid valves (linear solenoid valves) as inlet valves (refer to Japanese Patent Unexamined Publication JP-A-2003-19952). Specifically, the normally open linear solenoid valve includes a valve seat, a valve body which is normally biased in a valve opening direction from the valve seat by a spring, a core for drawing the valve body towards the valve seat by virtue of magnetic force and an exciting coil for exciting the core.

Additionally, when the inlet valve is made up of the normally open linear solenoid valve like above, a valve closing force (a force with which the valve body is pressed against the valve seat) can be changed arbitrarily by controlling an energization amount supplied to the exciting coil. Because of this, since the valve opening amount (a gap between the valve seat and the valve body) can be controlled by controlling the energization amount appropriately by taking into consideration a differential pressure between an upstream pressure and a downstream pressure of the inlet valve, hydraulic pressure within the wheel brake can be increased linearly (proportionally).

In the related art, however, there may be caused a situation in which disturbance such as discharge pulsation from the pump is generated on an upstream side of the inlet valve when increasing the pressure within the wheel brake. As this occurs, even though the inlet valve is attempted to be opened by a target valve opening amount, by taking advantage of the valve body of the inlet valve being affected by the pulsation, the balance between the differential pressure between the upstream pressure and the downstream pressure of the inlet valve and the energization amount is lost and the valve body produces self-oscillation. Due to this, there is a fear that so-called hunting, in which the valve body does not converge on a target position (a balanced position), is caused. When the hunting like this occurs, there has been a possibility that piping connected to the vehicle brake hydraulic pressure control apparatus resonates due to the pulsation of hydraulic pressure as a result of the hunting so as to produce noise.

SUMMARY OF THE INVENTION

The present invention has been made in view of these situations, and an object thereof is to provide a vehicle brake hydraulic pressure control apparatus which can suppress the pulsation of hydraulic pressure and resulting noise which occur as a result of hunting of the inlet valve (the normally open proportional valve).

With a view to solving the problem, according to an aspect of the invention, there is provided a vehicle brake hydraulic pressure control apparatus which controls to transmit hydraulic pressure generated in a hydraulic pressure source to wheel brakes, including:

normally open linear solenoid valves which allow transmission of the hydraulic pressure from the hydraulic pressure source to the wheel brakes and whose valve opening amounts are adjusted by energization amounts thereof;

normally closed solenoid valves which allow hydraulic pressures within the wheel brakes to escape therefrom; and a control unit which controls energization amounts of the normally open linear solenoid valves and the normally closed solenoid valves so as to switch the hydraulic pressures within the wheel brakes to a pressure increasing state, a pressure holding state or a pressure reducing state, wherein the control unit includes:

a initial current value calculation unit which calculates an initial current value to open the normally open linear solenoid valve when the hydraulic pressure is shifted from the pressure reducing state or the pressure holding state to the pressure increasing state;

a valve opening amount increasing unit which reduces the energization amount from the initial current value so as to increase a valve opening amount of the normally open linear solenoid valve;

an offsetting necessity determination unit which determines based on a predetermined condition whether or not the energization amount needs to be offset to an increase side only for a predetermined time period when the valve opening amount increasing unit reduces the energization amount; and an energization amount offsetting unit which executes an energization amount offsetting operation when the offsetting necessity determination unit determines that the energization amount needs to be offset.

Further, according to another aspect of the invention, there is provided a control method for controlling a vehicle brake hydraulic pressure control apparatus which switches hydraulic pressure within wheel brakes to a pressure increasing state, a pressure holding state or a pressure reducing state, the control method including:

calculating an initial current value which opens a normally open linear solenoid valve when the pressure reducing state or the pressure holding state is shifted to the pressure increasing state;

reducing the energization amount from the initial current value so as to increase a valve opening amount of the normally open linear solenoid valve;

determining whether or not the energization amount needs to be offset to an increase side only for a predetermined time period based on a predetermined condition when the energization amount is reduced; and executing an energization amount offsetting operation when it is determined that the energization amount needs to be offset.

Here, the "energization amount offsetting operation" means an operation for offsetting at least once the energization amount to the increase side only for the predetermined time period.

According to the aspect of the invention, for example, even though the normally open linear solenoid valve has hunted, if the offsetting necessity determination unit is configured so as to determine the necessity of offsetting when hunting conditions of the normally open linear solenoid valve are met, the necessity of offsetting is determined by the offsetting necessity determination unit, and the energization amount is offset by the energization offsetting unit. Then, by offsetting the energization amount in this way, the balanced relationship between the differential pressure which is in the hunting state and the energization amount can be disordered.

Here, the "balanced relationship between the differential pressure which is in the hunting state and the energization amount" means that the relationship between the differential pressure between the upstream pressure and the downstream pressure of the solenoid valve and the energization amount which was set to control the valve body to the target position before the occurrence of hunting is maintained as it is even after the occurrence of hunting, in which relationship the valve body continues to oscillate about the target position.

In addition, since the target position of the valve body changes by offsetting the energization amount in the way described above, the relationship between the valve body in the hunting state and the target position is disordered. Since the hunting can be allowed to converge by the balanced relationship between the differential pressure resulting with the valve body in the hunting state and the energization amount being disordered in that way, the pulsation of hydraulic pressure and resulting noise which occur as a result of hunting of the normally open linear solenoid valve can be suppressed.

Further, when there is not a fear that the normally open linear solenoid valve hunts, the offsetting necessity determination unit determines that no offsetting is necessary, and hence, since the energization amount is not offset, there occurs no situation in which consumed power is increased wastefully.

According to the aspect of the invention, since the balanced relationship between the differential pressure resulting with the valve body in the hunting state and the energization amount can be disordered by offsetting the energization amount, the hunting can be allowed to converge. Thus, the pulsation of hydraulic pressure and resulting noise which occur as a result of hunting of the normally open linear solenoid valve can be suppressed.

DETAILED DESCRIPTION OF THE PREFERRED EMBODIMENTS

Next, an embodiment of the invention will be described while referring to the drawings as required.

Figure 1:
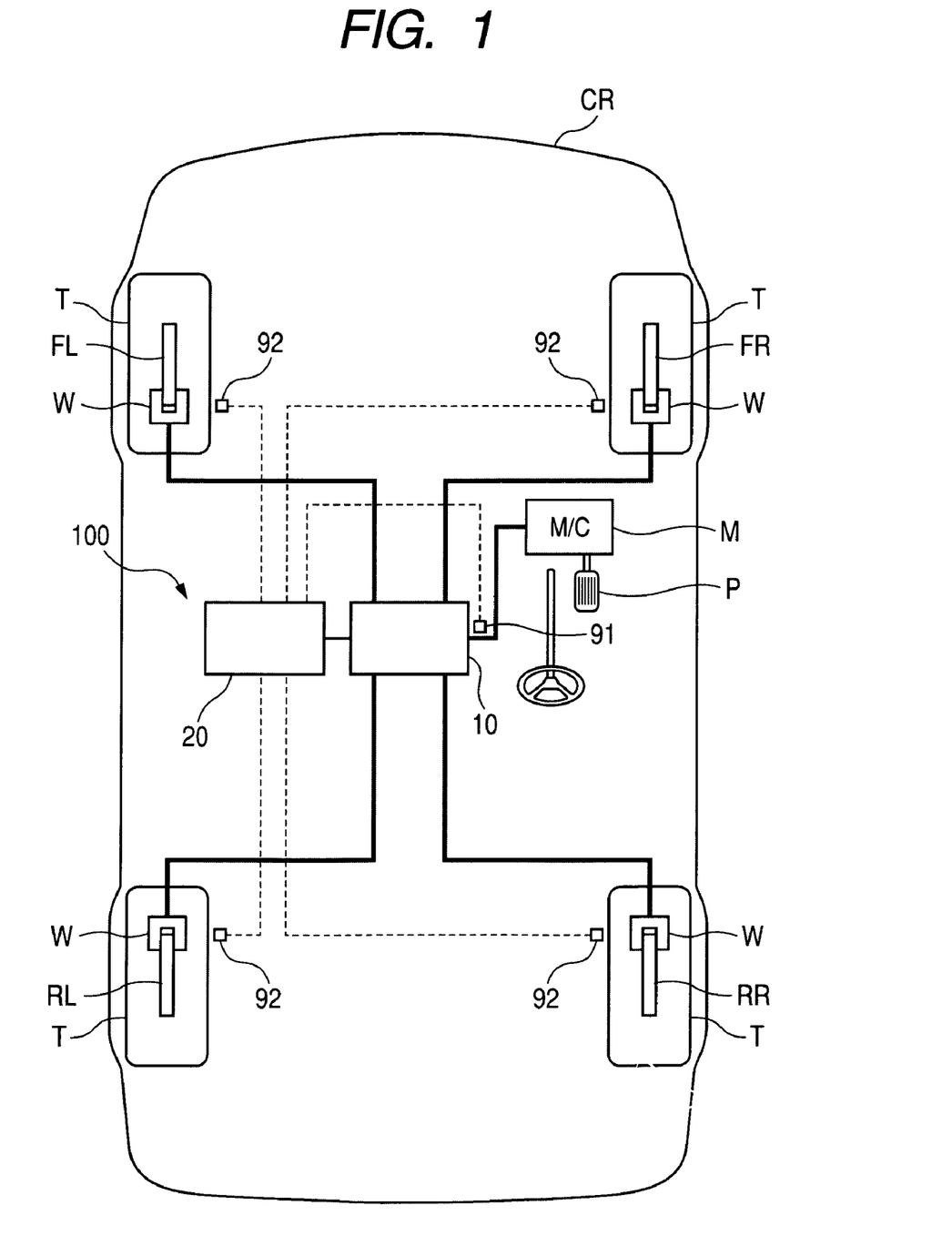
FIG. 1 is a block diagram of a vehicle provided with a vehicle brake hydraulic pressure control apparatus according to an embodiment of the invention.
Figure 2:
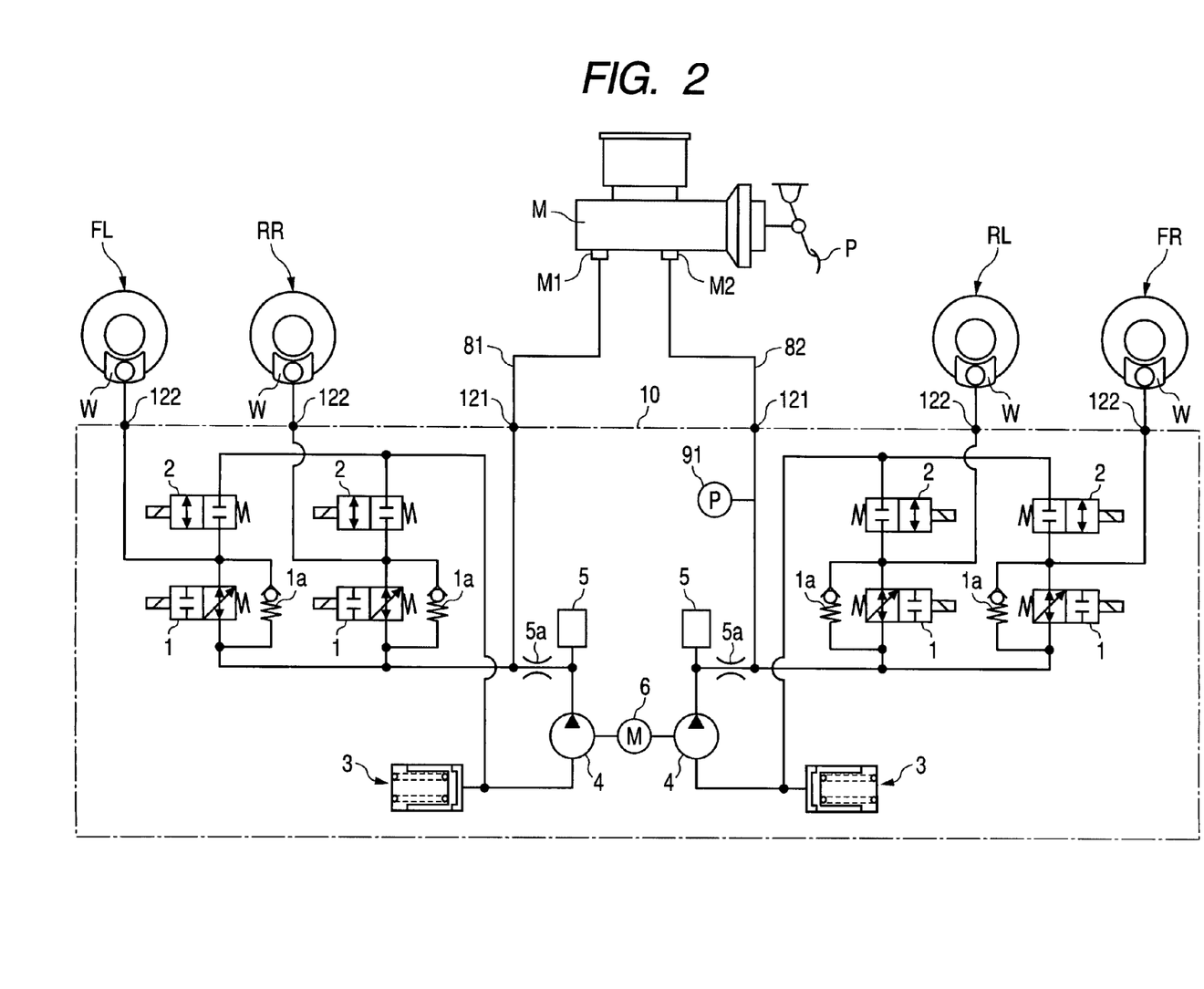
FIG. 2 is a block diagram showing the configuration of the vehicle brake hydraulic pressure control apparatus.

In the drawings to be referred to, FIG. 1 is a block diagram of a vehicle which is provided with a vehicle brake hydraulic pressure control apparatus according to an embodiment of the invention, and FIG. 2 is a block diagram showing the configuration of the vehicle brake hydraulic pressure control apparatus.

As shown in FIG. 1, a vehicle brake hydraulic pressure control apparatus 100 is to control appropriately brake forces applied to individual road wheels T of a vehicle CR. The vehicle brake hydraulic pressure control apparatus 100 includes mainly a hydraulic unit 10 in which fluid pipelines and various types of components are provided and a controller 20 for controlling appropriately the various types of components within the hydraulic unit 10.

Wheel brakes FL, RR, RL, FR are provided, respectively, in the road wheels T, and wheel cylinders W which each generate a brake force by virtue of a hydraulic pressure supplied from a master cylinder M functioning as an example of a hydraulic pressure source are provided, respectively, in the wheel brakes FL, RR, RL, FR. The master cylinder M and the wheel cylinders W are connected to the hydraulic unit 10. Then, a brake hydraulic pressure generated in the master cylinder M in accordance with a pedal effort acting on a brake pedal P (a braking operation by the driver) is controlled in the controller 20 and after that, the hydraulic unit 10 and is supplied to the wheel cylinders W.

A pressure sensor 91 for detecting a master cylinder pressure (a hydraulic pressure in the master cylinder M) and wheel speed sensors 92 for detecting respective wheel speeds of the road wheels T are connected to the controller 20. In addition, the controller 20 includes, for example, a CPU, a RAM, a ROM and input and output circuits and executes controls by implementing various types of calculating operations based on inputs from the pressure sensor 91 and the wheel speed sensors 92, as well as programs and data which are stored in the ROM. Note that the details of the controller 20 will be described later.

As shown in FIG. 2, the hydraulic unit 10 is disposed between the master cylinder M and the wheel brakes FL, RR, RL, FR. Two output ports M1, M2 of the master cylinder M are connected, respectively, to inlet ports 121 of the hydraulic unit 10 and outlet ports 122 thereof are connected, respectively, to the wheel brakes FL, RR, RL, FR. In addition, normally, fluid lines within the hydraulic unit 10 are made to communicate therethrough from the inlet ports 121 to the outlet ports 122, whereby the pedal effort on the brake pedal P is made to be transmitted to the wheel brakes FL, RR, RL, FR, respectively.

Four inlet valves 1, four outlet valves 2 and four check valves 1a are provided in the hydraulic unit 10 in such a manner as to correspond to the respective wheel brakes FL, RR, RL, FR. In addition, two reservoirs 3, two pumps 4, two dampers 5 and two orifices 5a are provided in such a manner as to correspond to respective outlet hydraulic lines 81, 82 which correspond, in turn, to the outlet ports M1, M2, and the hydraulic unit 10 also includes a motor 6 for driving the two pumps 4.

The inlet valves 1 are normally open linear solenoid valves which are disposed between the respective wheel brakes FL, RR, RL, FR and the master cylinder M (upstream of the respective wheel brakes FL, RR, RL, FR). The valve opening amount of the inlet valve 1 is made to be adjusted by an energization amount from the controller 20. The inlet valve 1 is normally open so as to allow transmission of a brake hydraulic pressure from the master cylinder M to the respective wheel brakes FL, RR, RL, RR.

In addition, the inlet valve 1 cuts off the hydraulic pressure that is transmitted from the brake pedal P to the respective wheel brakes FL, RR, RL, FR by being closed by the controller 20 when the corresponding road wheel T is likely to lock. Furthermore, the inlet valve 1 increases the hydraulic pressure in each of the wheel brakes FL, RR, RL, FR with a predetermined gradient by being controlled by the controller 20 in such a manner as to provide a predetermined valve closing force.

The outlet valves 2 are normally closed solenoid valves which are disposed between the respective wheel brakes FL, RR, RL, FR and the respective reservoirs 3 (on hydraulic lines each extending from a hydraulic line on a wheel cylinder W side of the inlet valve 1 to a hydraulic line reaching the reservoir 3 and the pump 4). Although the outlet valve 2 is normally closed, the outlet valve 2 causes the hydraulic pressure acting on each of the wheel brakes FL, RR, RL, FR to escape therefrom to the corresponding reservoir 3 by being opened by the controller 2 when the corresponding road wheel T is likely to lock.

The check valves 1a are connected in parallel to the inlet valves 1, respectively. These check valves 1a are valves which allow only flow of brake fluid from the respective wheel brakes FL, RR, RL, FR towards the master cylinder M and still allow the flow of brake fluid from the respective wheel brakes FL, RR, RL, FR towards the master cylinder M even in such a state that the input from the brake pedal P is released whereby the inlet valves 1 are closed.

The reservoirs 3 have a function to store temporarily brake fluid which is allowed to escape by the respective outlet valves 2 being opened.

The pumps 4 have a function to take in the brake fluid stored in the reservoirs 3 so as to return the brake fluid to the master cylinder M by the dampers 5 and the orifices 5a.

By their opening/closing states being controlled by the controller 20, the inlet valves 1 and the outlet valves 2 control hydraulic pressures in the wheel cylinders W of the respective wheel brakes FL, RR, RL, FR. For example, (1) in the normal state in which the inlet valves 1 are open and the outlet valves 2 are closed, with the brake pedal P kept depressed, a hydraulic pressure from the master cylinder M is transmitted to the wheel cylinders W as it is so that a pressure increasing state is generated within each of the wheel cylinders W;

(2) when the inlet valves 1 are closed and the outlet valves 2 are opened, brake hydraulic pressures generated in the wheel cylinders W are made to move out thereof towards the reservoirs 3 so that a pressure reducing state is generated within in each of the wheel cylinders W; and (3) when both the inlet valves 1 and the outlet valves 2 are closed, a pressure holding state in which a wheel cylinder pressure (a hydraulic pressure in the wheel cylinder W) is held is generated in each of the wheel cylinders W.

In addition, with the inlet valves 1 opened by a predetermined valve opening amount, a pressure increasing state in which the pressure within the wheel cylinder W is increased gradually with a predetermined gradient is generated in each of the wheel cylinders W. In addition, the controller 20 outputs a predetermined amount of current or a control signal to each inlet valve 1 and each outlet valve 2 to switch the hydraulic pressure in each wheel cylinder W to the pressure increasing state, the pressure reducing state or the pressure holding state in accordance with a target brake hydraulic pressure in the wheel cylinder W.

Figure 3:
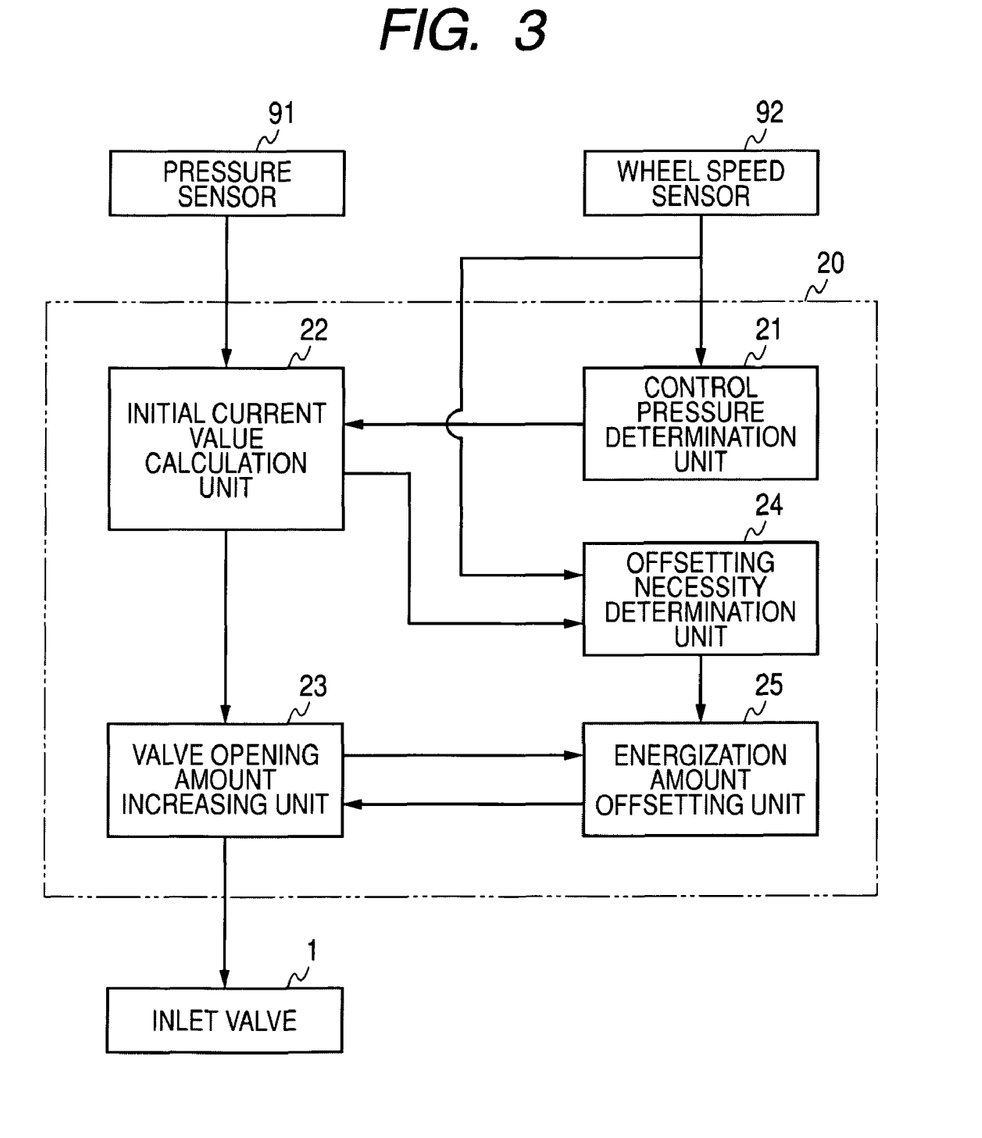
FIG. 3 is a block diagram showing the configuration of a controller.

Next, the details of the controller 20 will be described. In the drawings to be referred to, FIG. 3 is a block diagram showing the configuration of the controller.

The controller 20 is configured to include a control pressure determination unit 21, an initial current value calculation unit 22, a valve opening amount increasing unit 23, an offsetting necessity determination unit 24 and an energization amount offsetting unit 25.

The control pressure determination unit 21 has a function to determine to which in the pressure increasing state, the pressure reducing state and the pressure holding state the wheel cylinder pressure is set. Specifically, for example, when determining that the road wheel T is likely to lock when a speed ratio (a slip ratio) of a wheel speed detected by the wheel speed sensor 92 to a vehicle body speed which is estimated based on the wheel speeds of the four road wheels T becomes a predetermined value or higher and the wheel acceleration is 0 or smaller, the control pressure determination unit 21 determines that the wheel cylinder pressure is in the pressure reducing state. Here, the wheel acceleration is calculated from, for example, the wheel speed.

In addition, the control pressure determination unit 21 determines that the wheel cylinder pressure is in the pressure holding state when the wheel acceleration is larger than 0. Furthermore, determining that the road wheel T is contacting with the ground when the slip ratio becomes less than the predetermined value and the wheel acceleration is 0 or smaller, the control pressure determination unit 21 determines that wheel cylinder pressure is in the pressure increasing state.

Then, when determining that the caliper pressure is in the pressure increasing state (namely, the hydraulic pressure is shifted from the pressure reducing state or the pressure holding state to the pressure increasing state), the control pressure determination unit 21 outputs a pressure increase start signal to the initial current value calculation unit 22.

The initial current value calculation unit 22 has a function to calculate an initial current value to open the inlet valve 1 based on a difference between an estimated wheel cylinder pressure and a master cylinder pressure detected by the pressure sensor 91 (a pressure difference between a pressure resulting upstream and a pressure resulting downstream of the inlet valve 1), when receiving the pressure increase start signal from the control pressure determination unit 21.

Here, the "estimated wheel cylinder pressure" means a wheel cylinder pressure that is calculated by a known method, for example, a wheel cylinder pressure that is calculated (estimated) based on the master cylinder pressure detected by the pressure sensor 91 and the opening/closing state of the inlet valve 1 and the outlet valve 2. In addition, the "initial current value to open the inlet valve 1" means, as an example, a current value at which the valve starts to open, that is, a current value at which the differential pressure between the upstream pressure and the downstream pressure of the inlet valve 1 and a force with which the valve body is pushed in an opening direction by a spring is balanced with a valve closing force generated in the valve body by energization to the inlet valve 1. Note that in addition to the current value at which the valve starts to open, for example, a current value which is slightly lower or higher than the current value at which the valve starts to open may be used as the initial current value.

In addition, for calculation of this initial current value, for example, it may be preferable to use a table stored in the storage such as the ROM or RAM which shows a relationship between the initial current value and the differential pressure between the upstream pressure and the downstream pressure of the inlet valve 1. In addition, when having calculated an initial current value, this initial current value calculation unit 22 outputs the calculated initial current value to the valve opening amount increasing unit 23 and the offsetting necessity determination unit 24.

The valve opening amount increasing unit 23 has a function to change the energization amount of the inlet valve 1 to the initial current value and increase gradually the valve opening amount of the inlet valve (reduce gradually the valve closing force) by reducing the energization amount so changed towards a predetermined target current value with a predetermined gradient, when receiving the initial current value from the initial current value calculation unit 22.

Here, the "target current value" means a current value that is set for defining the wheel cylinder pressure to a predetermined target value by a pressure increasing control, and for example, the target current value may be calculated based on the wheel cylinder pressure target value or the energization amount resulting when the last pressure increasing control ended maybe set as the target current value.

In addition, to calculate this target current value, for example, a table which is stored in the storage unit such as the ROM or RAM and which shows a relationship between the target current value and the wheel cylinder pressure target value may be used. Additionally, as will be described later, the valve opening amount increasing unit 23 is also configured so as to change the energization amount by a signal from the energization amount offsetting unit 25.

The offsetting necessity determination unit 24 has a function to determine whether the energization amount needs to be offset to an increase side only for a predetermined time period based on a predetermined condition when the valve opening amount increasing unit 23 reduces the energization amount.

Specifically, when the initial current value obtained from the initial current value calculation unit 22 is less than a predetermined value and the vehicle body speed calculated based on the wheel speeds is less than a predetermined value, the offsetting necessity determination unit 24 estimates that there will be a fear that the inlet valve 1 hunts and then determines that offsetting is necessary. Then, determining that offsetting is necessary, this offsetting necessity determination unit 24 outputs an offsetting allowing signal indicating the determination to the energization amount offsetting unit 25.

The energization amount offsetting unit 25 has a function to offset, when receiving the offsetting allowing signal from the offsetting necessity determination unit 24, the energization amount of current supplied from the valve opening amount increasing unit 23 to the inlet valve 1 to an increase side only for a predetermined time period.

Specifically, for example, when receiving the offsetting allowing signal, the energization amount offsetting unit 25 obtains offsetting timing information, an offsetting amount and an offsetting time which are stored in the storage unit such as the ROM or RAM and follows the timing information to output the offsetting amount and the offsetting time to the valve opening amount increasing unit 23 at a predetermined timing.

Then, when receiving the offsetting amount and the offsetting time from the energization amount offsetting unit 25, the valve opening increasing unit 23 offsets the energization amount to the increase side according to the offsetting amount only for the predetermined offsetting time. Here, the timing information, the offsetting amount and the offsetting time may be set appropriately through experiments or the like.

Figure 4:
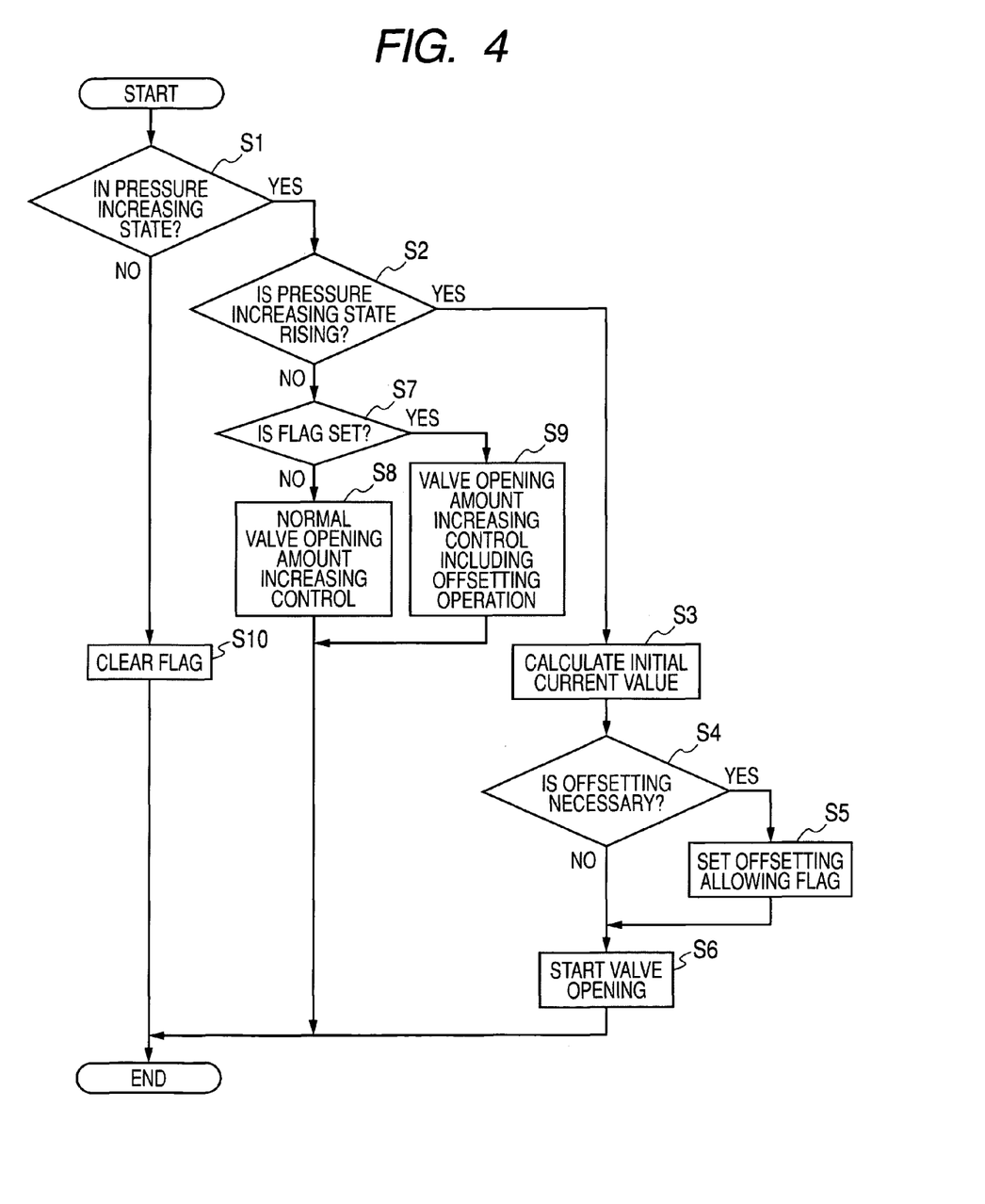
FIG. 4 is a flowchart illustrating a valve opening control by the controller.

The controller 20 which is configured as has been described heretofore performs a valve opening control (a pressure increasing control) based on a flowchart shown in FIG. 4. Here, FIG. 4 is a flowchart illustrating a valve opening control by the controller.

As shown in FIG. 4, the controller 20 firstly determines whether or not the wheel cylinder pressure is in the pressure increasing state, that is, whether or not the control pressure determination unit 21 has determined that the wheel cylinder pressure is in the pressure increasing state (S1).

If the controller 20 determines in step S1 that the wheel cylinder pressure is in the pressure increasing state (Yes), the controller 20 determines whether or not the pressure increasing state is starting (S2). Specifically, in step S2, the present state is compared with the last state of the wheel cylinder pressure, which are determined by the control pressure determination unit 21, and if the present state is in the pressure increasing state and the last state was in the pressure reducing state or the pressure holding state, then, it is determined that the pressure increasing state is starting (Yes).

In addition, if it is determined in step S2 that the present state and the last state is and was in the pressure increasing state, respectively, it is then determined that the pressure increasing state is not starting (No).

If it is determined in step S2 that the pressure increasing state is starting (Yes), the controller 20 calculates an initial current value (S3).

Thereafter, the controller 20 estimates based on the initial current value and the vehicle body speed whether or not there is a fear of hunting of the inlet valve 1 and then determines whether or not offsetting is necessary (S4).

If the controller 20 determines in step S4 that offsetting is necessary (Yes), the controller 20 sets an offsetting allowing flag which indicates the allowing of offsetting (S5).

After step S5 or during step S4, if the controller 20 determines that offsetting is unnecessary (No), the controller 20 starts a valve opening control (S6), ends this control temporarily and returns to the operation of step S1 again.

The flow having returned to step S1 from step S6 again, if determining as Yes in step S1 again, since this means that the present state and last state of the wheel cylinder pressure are in the pressure increasing state, respectively, the controller 20 determines in step S2 that the pressure increasing state is not starting (No).

Then, if determining as No in step S2 in this way, the controller 20 then determines whether or not the offsetting allowing flag is set (S7).

If the controller 20 determines in step S7 that the offsetting allowing flag is not set, a normal valve opening amount increasing control is performed (S8), whereas if the controller 20 determines that the offsetting allowing flag is set, a valve opening amount increasing control including an energization amount offsetting operation is performed (S9). Thereafter, after ends this control temporarily, the controller 20 returns to the operation in step 1 again.

Then, if determining in step S1 that the wheel cylinder pressure is not in the pressure increasing state (No), the controller 20 clears the offsetting allowing flag (S10) and ends the control following the flow in FIG. 4.

Next, states of the energization amount, the master cylinder side pressure and the wheel cylinder W side pressure when the valve opening control is carried out on the inlet valve 1 will be described.

Figure 5A:
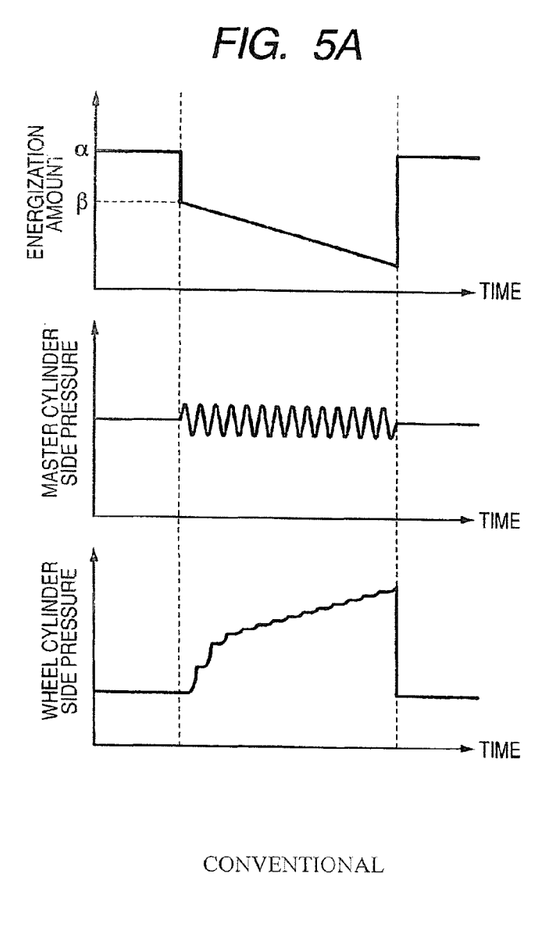
FIG. 5A is a time chart showing states of energization amount and the like which result when the valve opening control is carried out on an inlet valve by a conventional controller which has no energization amount offsetting unit.
Figure 5B:
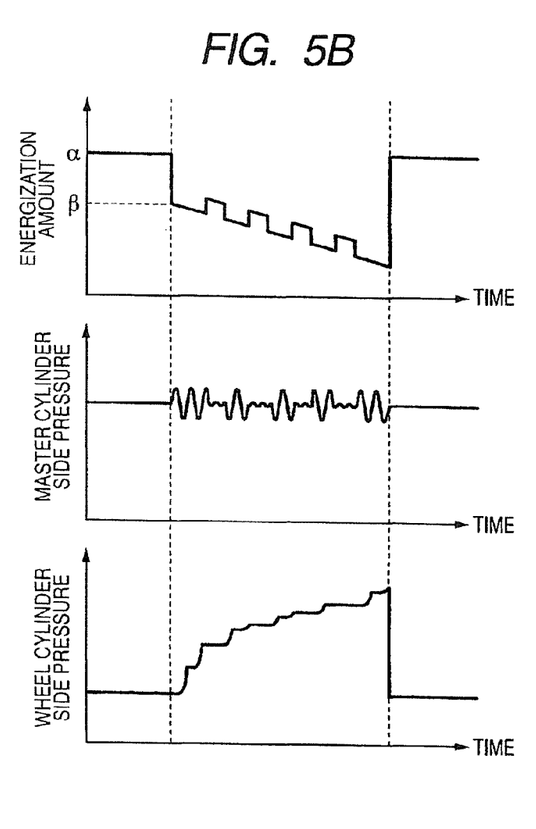
FIG. 5B is a time chart showing states of energization amount and the like which result when the valve opening control is carried out on an inlet valve by the controller according to the embodiment which has an energization amount offsetting unit.

FIG. 5A shows a time chart which shows states of the energization amount and the like which result when the valve opening control is carried out on the inlet valve by a conventional controller which has no energization amount offsetting unit. FIG. 5B is a time chart which shows states of the energization amount and the like which result when the valve opening control is carried out on the inlet valve by the controller according to the invention which has the energization amount offsetting unit.

Firstly, states of the energization amount and the like which result when the valve opening control is carried out on the inlet valve by the conventional controller will be described.

As shown in FIG. 5A, for example, when the wheel cylinder side pressure shifts from the pressure holding state (the state in which the inlet valve is closed completely) to the pressure increasing state, the controller changes a current supplied to the inlet valve from a current value α at which the inlet valve is put in a completely closed state to an initial current value β which is lower than the current value α. Thereafter, the controller increases gradually the wheel cylinder side pressure by reducing the energization amount of the inlet valve gradually from the initial value β.

As this occurs, when disturbance is generated on an upstream side of the inlet valve by virtue of pulsation of the pump, the inlet valve is caused to hunt. Due to this hunting, a pressure residing closer to the master cylinder side than the inlet valve and a pressure residing closer to the wheel cylinder side than the inlet valve pulsate.

Here, if the master cylinder side pressure is increasing higher than an initial value (a pressure resulting immediately before the energization amount is made to be the initial current value β), the inlet valve opens and the wheel cylinder side pressure is increased. On contrary, if the master cylinder side pressure is reducing lower than the initial value, the inlet valve is closed and the wheel cylinder side pressure is held. Because of this, when the master cylinder side pressure pulsates, the wheel cylinder side pressure repeats being increased and held to thereby pulsate.

Contrary, as shown in FIG. 5B, when reducing the energization amount gradually, the controller 20 according to the embodiment offsets the energization amount to the increase side at the predetermined timing. By this action, a hunting state which is in a balanced relationship between the differential pressure between the upstream pressure and the downstream pressure of the inlet valve 1 and the energization amount is disordered during the energization amount is being offset. Accordingly, as shown in the figure, the pulsation of the master cylinder M side pressure and the pulsation of the wheel cylinder W side pressure, that is, the hunting of the inlet valve 1 are allowed to converge temporarily.

Here, in a state that the range of pulsation of the master cylinder M side pressure is narrowed by the energization amount being offset, the inlet valve 1 is closed and the wheel cylinder W side pressure is held. Therefore, the pulsation on the wheel cylinder W side is suppressed while the energization amount is being offset. In addition, repeating offsetting like this a plurality of times, time during which the master cylinder M side pressure and the wheel cylinder W side pressure pulsate can be made shorter than the conventional case and the oscillation of piping which connects the master cylinder M with the vehicle brake hydraulic pressure control apparatus 100 can be suppressed.

Thus, according to the configuration of the invention that has been described heretofore, the following advantage can be obtained by the embodiment.

Since the hunting state which is in the balanced relationship between the differential pressure between the upstream pressure and the downstream pressure of the inlet valve 1 and the energization amount can be disordered by offsetting the energization amount, the hunting of the inlet valve 1 can be made to converge, and the pulsation of hydraulic pressure caused by the hunting inlet valve 1 and resulting noise can be suppressed. In addition, since the offsetting necessity determination unit 24 determines that offsetting is unnecessary when there is no fear of hunting of the inlet valve 1 and hence the energization mount is not offset, there occurs no situation in which consumed power is increased wastefully.

Since offsetting is made to be repeated a plurality of times, the pulsation of hydraulic pressure and resulting noise can be suppressed.

Note that the invention is not limited to the embodiment that has been described above, and hence, the invention can be applied to various forms which will be illustrated below.

In the embodiment, while the invention is described as being applied to the control to reduce the energization amount towards the predetermined target current value, the invention can also be applied, for example, to a case where the target current value is changed during the control to reduce the energization amount. Note that for example, a case where a correction control is carried out to deal with a change in road surface friction coefficient or master cylinder pressure corresponds to the case where the target current value is changed. In addition, the invention can be applied to a control in which the initial current value is reduced from the initial current value with a predetermined gradient without determining a target current value and the gradient is made steeper in the course of the reduction of the initial current value as required by conditions.

In the embodiment, while the current value of current outputted from the valve opening amount increasing unit 23 is made to be changed (offset) as required by the energization amount offsetting unit 25, the invention is not limited thereto. For example, offsetting may be implemented by switching the route through which current flows between, for example, a route having a large resistance and a route having a small resistance without changing the current value of current outputted from the valve opening amount increasing unit 23.

In the embodiment, while the initial current value is calculated from the pressure difference between the upstream pressure and the downstream pressure of the inlet valve 1, the invention is not limited thereto. For example as described in the JP-A-2003-19952, a configuration may be adopted in which the inlet valve 1 is opened gradually with a predetermined gradient when a first pressure increasing control is implemented, an energization amount supplied to the inlet valve 1 is stored at a point in time at which the wheel cylinder pressure is actually increased (at a point in time at which the inlet valve 1 is opened), and the stored energization amount is used as the initial current value for a second pressure increasing control and onward.

In the embodiment, while the estimated wheel cylinder pressure which was estimated from the master cylinder pressure is made use of as the wheel cylinder pressure, the invention is not limited thereto, and hence, pressure sensors may be provided for the respective wheel cylinders W, so that values detected by the respective pressure sensors are made use of as the wheel cylinder pressure.

In the embodiment, while the pressure detected by the pressure sensor 91 is made use of as the master cylinder pressure, the invention is not limited thereto, and hence, a master cylinder pressure estimation unit may be provided in the controller 20, so that an estimated master cylinder pressure estimated by the master cylinder pressure estimation unit is made use of as the master cylinder pressure.

In the embodiment, while the conditions that the initial current value is less than the predetermined value and that the vehicle body speed is less than the predetermined value are adopted as the predetermined conditions for making the determination that offsetting is necessary, the invention is not limited thereto. For example, a condition that the master cylinder side pressure is less than a predetermined value or a condition that the wheel cylinder side pressure is less than a predetermined value may be added further to the aforesaid determination conditions.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicle brake hydraulic pressure control apparatus which controls to transmit hydraulic pressure generated in a hydraulic pressure source to wheel brakes, comprising:
   normally open linear solenoid valves which allow transmission of the hydraulic pressure from the hydraulic pressure source to the wheel brakes and whose valve opening amounts are adjusted by energization amounts thereof;
   normally closed solenoid valves which allow hydraulic pressures within the wheel brakes to escape therefrom; and
   a control unit which controls the energization amounts of the normally open linear solenoid valves and the normally closed solenoid valves so as to switch the hydraulic pressures within the wheel brakes to a pressure increasing state, a pressure holding state or a pressure reducing state, wherein
   the control unit comprises:
      an initial current value calculation unit which calculates an initial current value to open the normally open linear solenoid valve when the hydraulic pressure is shifted from the pressure reducing state or the pressure holding state to the pressure increasing state;
      a valve opening amount increasing unit which reduces the energization amount from the initial current value so as to increase a valve opening amount of the normally open linear solenoid valve;
      an offsetting necessity determination unit which determines based on a predetermined condition whether or not the energization amount needs to be offset to an increase side only for a predetermined time period when the valve opening amount increasing unit reduces the energization amount; and
      an energization amount offsetting unit which executes an energization amount offsetting operation when the offsetting necessity determination unit determines that the energization amount needs to be offset, wherein the predetermined condition, on the basis of which the offsetting necessity determination unit determines whether or not the energization amount needs to be offset, is that: the initial current value calculated by the initial current value calculation unit is less than a predetermined value, and a vehicle body speed is also less than a predetermined value.

2. The vehicle brake hydraulic pressure control apparatus according to claim 1, further comprising:
   a pressure sensor for detecting a hydraulic pressure in the master cylinder; and
   wheel speed sensors for detecting respective wheel speeds of road wheels.

3. The vehicle brake hydraulic pressure control apparatus according to claim 1, further comprising a control pressure determination unit which determines whether a wheel cylinder pressure is set in the pressure increasing state, the pressure reducing state or the pressure holding state.

4. The vehicle brake hydraulic pressure control apparatus according to claim 3, wherein the control pressure determination unit:
   determines that the wheel cylinder pressure is in the pressure reducing state when the control pressure determination unit determines that a road wheel is likely to lock when a slip ratio of a wheel speed to a vehicle body speed becomes a predetermined value or higher and wheel acceleration is 0 or smaller;
   determines that the wheel cylinder pressure is in the pressure holding state when the wheel acceleration is larger than 0; and
   determines that the wheel cylinder pressure is in the pressure increasing state when the road wheel is contacting with ground when the slip ratio becomes less than the predetermined value and the wheel acceleration is 0 or smaller.

5. The vehicle brake hydraulic pressure control apparatus according to claim 4, wherein the control pressure determination unit outputs a pressure increase start signal to the initial current value calculation unit when determining that a caliper pressure is in the pressure increasing state.

6. The vehicle brake hydraulic pressure control apparatus according to claim 5, wherein the initial current value calculation unit calculates the initial current value to open the normally open linear solenoid valves based on a difference between an estimated wheel cylinder pressure and a master cylinder pressure detected by a pressure sensor, when receiving the pressure increase start signal from the control pressure determination unit.

7. The vehicle brake hydraulic pressure control apparatus according to claim 6, wherein the initial current value to open the normally open linear solenoid valves is a current value at which the normally open linear solenoid valves start to open.

8. The vehicle brake hydraulic pressure control apparatus according to claim 1, wherein the initial current value is provided by a table stored in a storage, which shows a relationship between the initial current value and differential pressure between an upstream pressure and a downstream pressure of the normally open linear solenoid valve.

9. The vehicle brake hydraulic pressure control apparatus according to claim 1, wherein the valve opening amount increasing unit changes the energization amounts of the normally open linear solenoid valves to the initial current value and increases gradually the valve opening amount of the normally open linear solenoid valves by reducing the energization amounts so changed towards a predetermined target current value with a predetermined gradient, when receiving the initial current value from the initial current value calculation unit.

10. The vehicle brake hydraulic pressure control apparatus according to claim 1, wherein the offsetting necessity determination unit determines that offsetting is necessary by estimating that there is a likelihood that the normally open linear solenoid valves will hunt.

11. The vehicle brake hydraulic pressure control apparatus according to claim 1, wherein the energization amount offsetting unit obtains offsetting timing information, an offsetting amount and an offsetting time from a storage unit and follows the timing information to output the offsetting amount and the offsetting time to the valve opening amount increasing unit at a predetermined timing.

12. The vehicle brake hydraulic pressure control apparatus according to claim 11, wherein when receiving the offsetting amount and the offsetting time from the energization amount offsetting unit, the valve opening increasing unit offsets the energization amount to the increase side according to the offsetting amount only for the predetermined offsetting time.

13. A control method for controlling a vehicle brake hydraulic pressure control apparatus which switches hydraulic pressure within wheel brakes to a pressure increasing state, a pressure holding state or a pressure reducing state, the control method comprising:
   calculating an initial current value which opens a normally open linear solenoid valve when the pressure reducing state or the pressure holding state is shifted to the pressure increasing state;
   reducing an energization amount from the initial current value so as to increase a valve opening amount of the normally open linear solenoid valve;
   determining whether or not the energization amount needs to be offset to an increase side only for a predetermined time period based on a predetermined condition when the energization amount is reduced; and
   executing an energization amount offsetting operation when it is determined that the energization amount needs to be offset, wherein the initial current value calculated by the initial current value calculation unit is less than a predetermined value, and a vehicle body speed is also less than a predetermined value.

14. The control method according to claim 13, wherein when a wheel cylinder side pressure shifts from the pressure holding state to the pressure increasing state, the control method changes a current supplied to the normally open linear solenoid valve from a current value $\alpha$ at which the normally open linear solenoid valve is put in a completely closed state to an initial current value $\beta$ which is lower than the current value $\alpha$.

15. The control method according to claim 14, further comprising gradually increasing a wheel cylinder side pressure by reducing the energization amount of the normally open linear solenoid valve gradually from the initial value $\beta$.

16. The control method according to claim 15, wherein by the reducing the energization amount gradually, a pulsation of a master cylinder side pressure and a pulsation of a wheel cylinder side pressure converge temporarily.

17. The control method according to claim 16, wherein in a state that a range of pulsation of the master cylinder side pressure is narrowed by the energization amount being offset, the normally closed solenoid valve is closed and the wheel cylinder side pressure is held.

18. The control method according to claim 15, wherein the pulsation on the wheel cylinder side is suppressed while the energization amount is being offset.

19. The control method according to claim 13, wherein a hunting state which is in a balanced relationship between a differential pressure between an upstream pressure and downstream pressure of the normally closed solenoid valve and the energization amount is disordered by offsetting the energization amount.

* * * * *